United States Patent [19]
Brodesser

[11] 3,941,006
[45] Mar. 2, 1976

[54] FREE FLOATING BELT TENSIONER

[75] Inventor: Gerd R. Brodesser, Plano, Tex.

[73] Assignee: Xerox Corporation, Stamford, Conn.

[22] Filed: Nov. 25, 1974

[21] Appl. No.: 526,885

[52] U.S. Cl. .................. 74/242.1 R; 74/242.1 TA
[51] Int. Cl.² ............................................. F16H 7/12
[58] Field of Search .. 74/242.8, 242.1 TA, 242.1 R, 74/242.11 A

[56] References Cited
UNITED STATES PATENTS

| | | | |
|---|---|---|---|
| 716,520 | 12/1902 | Cole | 74/242.11 A |
| 1,338,405 | 4/1920 | Stickney | 74/242.11 A |
| 2,897,683 | 8/1959 | Carver | 74/242.1 R |

*Primary Examiner*—Samuel Scott
*Assistant Examiner*—A. Russell Burke

[57] ABSTRACT

A belt tensioner comprising first and second rollers connected by a "Z" shaped member upon which the rollers are journaled for rotation.

4 Claims, 5 Drawing Figures

FREE FLOATING BELT TENSIONER

BACKGROUND OF THE INVENTION

This invention relates to belt tensioning devices and, more particularly, to belt tensioning devices which are simple to manufacture and easily installed on a belt.

In apparatus utilizing a belt to tranfer motion from a driving pulley to a driven pulley, some means must be provided for removal and/or installation of the belt around the pulleys. One way of accomplishing this is to have the distance between the two pulleys adjustable. When a belt is to be removed or installed, the pulleys are moved toward each other, the removal or installation of the belt is accomplished, and the pulleys are moved away from each other to tighten the belt. Another way of accomplishing the same result when the pulleys are not easily moved is to use a belt which loosely fits over the pulleys and then utilize a belt tensioner, or tightener, to apply pressure to the belt in order to increase the effective distance the belt must travel so that the belt is properly tensioned. A problem with prior art belt tensioning devices is that they are either fairly complex, with springs being utilized to apply pressure to the belt, or else they are so attached to the apparatus in which the belt and pulleys are utilized so as to make it difficult or inconvenient to remove or install a belt.

It is therefore an object of this invention to provide a belt tensioning device for use with fixed pulleys.

It is a further object of this invention to provide a belt tensioning device of simple construction.

It is yet a further object of this invention to provide a belt tensioning device which is easy to install and does not interfere with the convenient removal or installation of the belt.

SUMMARY OF THE INVENTION

In accordance with the principles of this invention, a belt tensioner is provided which comprises a pair of rollers journaled for rotation on a "Z" shaped member.

DESCRIPTION OF THE DRAWING

The foregoing will become more readily apparent upon reading the following description in conjunction with the drawing in which.

DESCRIPTION OF THE ILLUSTRATIVE EMBODIMENT

Figure 1:
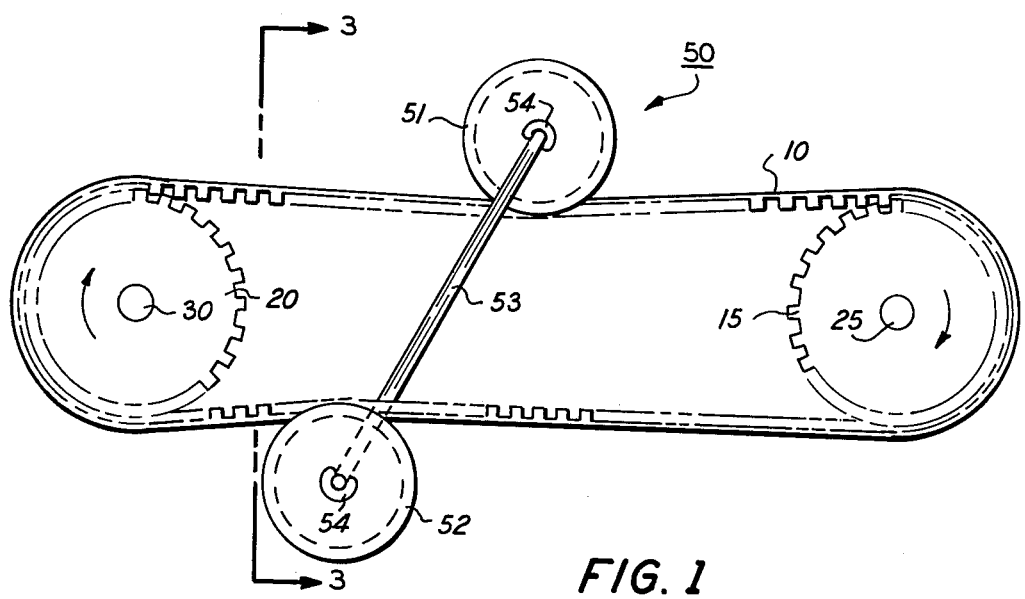
FIG. 1 is a side elevation showing an installation of one form of this invention.
Figure 2:
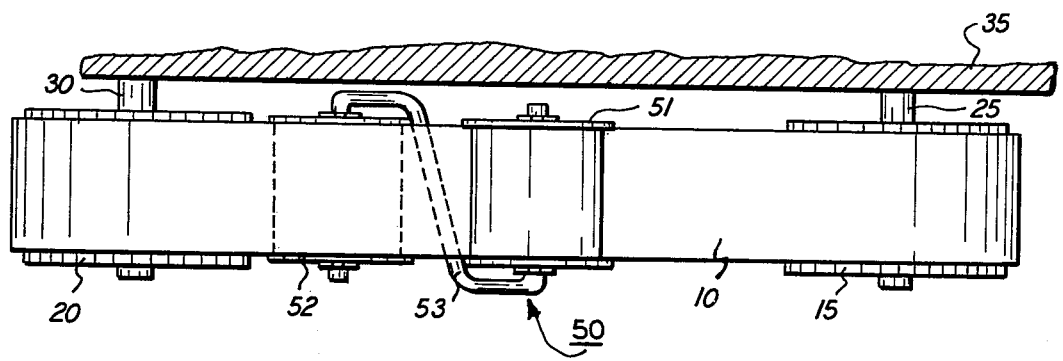
FIG. 2 is a top plan view of the apparatus shown in FIG. 1.
Figure 3:
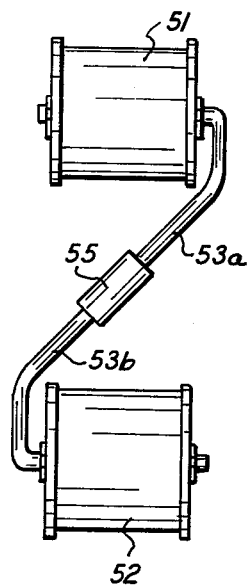
FIG. 3 is a transverse vertical section taken on the line 3—3 of FIG. 1.

Turning now to the drawing, and in particular FIGS. 1–3, depicted therein is a timing belt arrangement in which is incorporated apparatus utilizing the principles of this invention. Toothed belt 10 is wrapped around pulleys 15 and 20, which move in the direction shown by the arrows. Although a toothed belt and complementarily toothed pulleys are shown, it is to be understood that a flat or O-shaped belt, with the proper pulleys, may be utilized without departing from the spirit and scope of this invention. Pulleys 15 and 20 are mounted for rotation on shafts 25 and 30, respectively, these shafts being shown as extending into housing 35. One of the two pulleys is the driving pulley and the other of the two pulleys is the driven pulley. However, for purposes of describing this invention, it does not matter which of the pulleys is the driver and which is driven.

Belt tensioner 50 is comprised of rollers 51 and 52 connected by, and journaled for rotation on, Z-shaped member 53. Member 53 comprises a pair of parallel arms and a connecting arm. Rollers 51 and 52 must have a reasonable coefficient of friction with respect to belt 10 and may typically be manufactured of a material such as nylon or teflon. The distance between the flanges of rollers 51 and 52 should give sufficient clearance over the width of belt 10 to reduce slop. The height of the flanges of rollers 51 and 52 should be greater than the thickness of belt 10, or at least great enough so there is no tendency for the belt to go over the flanges.

As shown in FIG. 3 rollers 51 and 52 are held onto member 53 by means of grip rings 54, but any other suitable holding device, such as cotter pins for example, may be utilized. For any given belt/pulley arrangement, the distance between rollers 51 and 52 is chosen to give the proper tension to belt 10. It is readily apparent from the drawing that if belt 10 may be loosely removed from or installed on pulleys 15 and 20, then tensioner 50 may be easily manipulated by the fingers of an operator to slip through and over belt 10 to thereby tighten the belt around the pulleys.

It is seen from FIG. 1, that belt tensioning device 50 is slanted in the direction of movement of belt 10. If this belt movement is reversed, the slant will likewise reverse. The amount of slant depends upon the tension applied to belt 10 by tensioning device 50.

Figure 4:
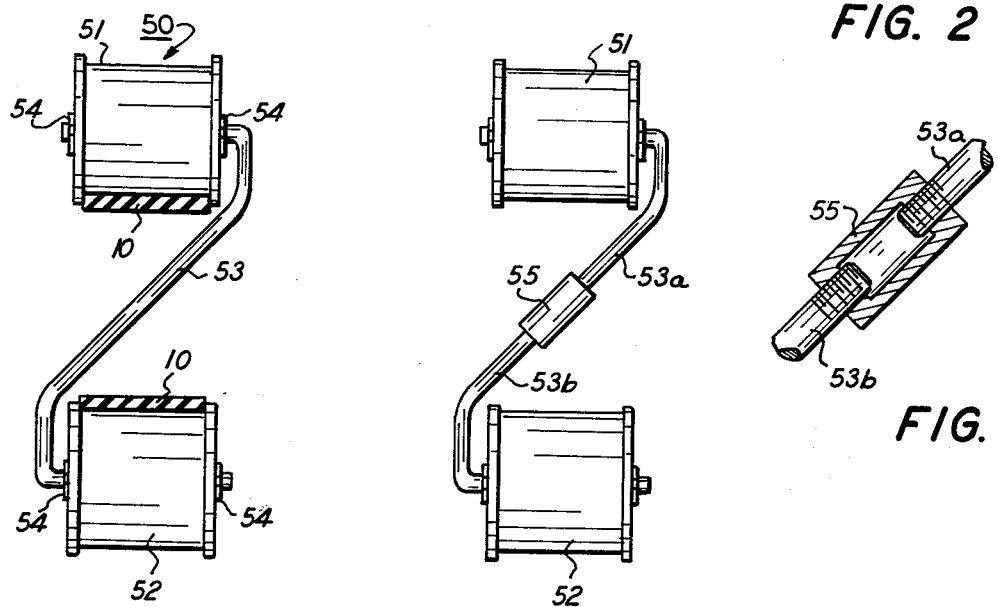
FIG. 4 is an alternate embodiment of this invention.
Figure 5:
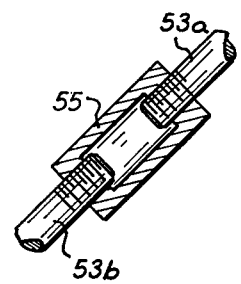
FIG. 5 is a cross-sectional view of a portion of the embodiment of FIG. 4.

An alternate embodiment for Z-shaped member 53 is depicted in FIGS. 4 and 5. It is seen from these FIGS. that rollers 51 and 52 are connected by members 53a and 53b and member 55. The ends of members 53a and 53b opposite the rollers 51 and 52 have exterior threads and member 55 has interior threads, as plainly shown in the FIG. 5 cross-sectional view. The direction of the threads of members 53a and 53b are opposite to each other, as are the respective threaded ends of member 55. Member 55 in combination with members 53 and 53b operates as a turnbuckle assembly so that the distance between rollers 51 and 52 is readily adjustable to accommodate different belt lengths, pulley sizes, and pulley separation distances.

A problem solved by the instant invention is that of belt 10 having a tendency to "walk" off pulleys 15 and 20. Looking at FIG. 3, it is seen that any tendency of belt 10 to move toward the right will cause belt tensioner 50 to rotate slightly in a clockwise direction. This slight rotation of belt tensioner 50 will tend to push the lower end of belt 10 toward the left, thereby compensating for any tendency of the upper end of belt 10 to move toward the right. It has been experimentally determined that the "Z" shape of member 53 is preferred. A "C" shape for member 53 has been tried but this does not prevent the above-described walking. This appears to be due to the fact that the C-shaped member does not have a balanced weight distribution and tends by itself, under the influence of gravity, to actually help the walking of the belt. The use of a Z-shaped member, on the other hand, gives a totally balanced system which prevents the walking of the belt.

An additional advantage of this invention over prior art belt tensioners is that no vibration is imparted from the belt to the apparatus through the tensioner. This is due to the free floating nature of the design. Vibration can sometimes cause a problem in apparatus utilizing sensitive devices, such as deflection galvanometers, where belts are driven by stepper motors.

Accordingly, there has been shown a belt tensioning device for use with fixed pulleys, the belt tensioning device being of simple construction and easy to install. This belt tensioning device functions to maintain belt tension to whatever specifications are desired and at the same time prevents the belt from walking off the side of a pulley. It is understood that the above-described arrangement is merely illustrative of the application of the principles of this invention. Numerous other arrangements may be devised by those skilled in the art without departing from the spirit and scope of this invention.

What is claimed is:

1. In combination with a pulley-driven belt, a belt tensioner for applying a desired tension to said belt; said belt tensioner comprising a pair of rollers and a Z-shaped member for connecting said rollers, each of said rollers being mounted for rotation on one of the parallel arms of said Z-shaped member.

2. The combination of claim 1 wherein the connecting arm of said Z-shaped member has a length chosen in accordance with said desired tension.

3. The combination of claim 2 wheren said Z-shaped member includes length adjusting means connecting said parallel arms.

4. The combination of claim 3 wherein said length adjusting means comprises a turnbuckle assembly.

* * * * *

UNITED STATES PATENT AND TRADEMARK OFFICE
CERTIFICATE OF CORRECTION

PATENT NO. : 3,941,006
DATED : March 2, 1976
INVENTOR(S) : Gerd R. Brodesser

It is certified that error appears in the above-identified patent and that said Letters Patent are hereby corrected as shown below:

Col. 2, line 15, change "teflon" to --TEFLON (a trademark)--

Signed and Sealed this

Twentieth Day of July 1976

[SEAL]

Attest:

RUTH C. MASON
*Attesting Officer*

C. MARSHALL DANN
*Commissioner of Patents and Trademarks*